United States Patent [19]

Simeone et al.

[11] Patent Number: 5,663,240

[45] Date of Patent: Sep. 2, 1997

[54] POWDER COATING OF EPOXY-FUNCTIONAL ACRYLIC COPOLYMER AND POLYCARBOXYLIC ACID

[75] Inventors: Robert L. Simeone, Pittsburgh; Robert D. Lippert, Butler; James B. O'Dwyer, Valencia; Charles M. Kania, Natrona Heights, all of Pa.

[73] Assignee: PPG Industries, Inc., Pittsburgh, Pa.

[21] Appl. No.: 615,745

[22] Filed: Mar. 14, 1996

Related U.S. Application Data

[60] Continuation of Ser. No. 375,323, Jan. 18, 1995, abandoned, which is a division of Ser. No. 143,722, Nov. 19, 1993, Pat. No. 5,407,707.

[51] Int. Cl.$^6$ ................................................. C08L 33/14
[52] U.S. Cl. .................................. 525/327.3; 525/165
[58] Field of Search ............................. 525/165, 327.3

[56] References Cited

U.S. PATENT DOCUMENTS

| | | | |
|---|---|---|---|
| 4,027,066 | 5/1977 | Victorius | 524/40 |
| 4,042,645 | 8/1977 | Hirota et al. | 260/830 P |
| 4,069,274 | 1/1978 | Shibata et al. | 260/836 |
| 4,091,049 | 5/1978 | Labana et al. | 260/836 |
| 4,181,642 | 1/1980 | Holle et al. | 260/37 EP |
| 4,323,600 | 4/1982 | Sakata et al. | 427/407.1 |
| 4,499,239 | 2/1985 | Murakami et al. | 525/111 |
| 4,871,806 | 10/1989 | Shalati et al. | 525/108 |
| 4,971,837 | 11/1990 | Martz et al. | 422/388.2 |
| 5,153,252 | 10/1992 | Skora | 524/372 |
| 5,256,452 | 10/1993 | McGonigal et al. | 427/407.1 |
| 5,270,391 | 12/1993 | Miyazaki et al. | 525/194 |
| 5,270,416 | 12/1993 | Toman et al. | 526/773 |
| 5,384,367 | 1/1995 | Swarup et al. | 525/208 |
| 5,395,659 | 3/1995 | Gräf et al. | 427/407.1 |

FOREIGN PATENT DOCUMENTS

| | | |
|---|---|---|
| 0462840 | 12/1991 | European Pat. Off. . |
| 52-77137 | 6/1977 | Japan . |
| 1338204 | 11/1973 | United Kingdom . |

OTHER PUBLICATIONS

Derwent Accession No. 77–56604Y/32 for Japanese Patent No. 52-77137, Daisel Ltd., Jun. 77.

*Primary Examiner*—Robert E. Sellers
*Attorney, Agent, or Firm*—Kenneth J. Stachel

[57] ABSTRACT

A powder coating composition comprises (a) from 60–90 percent by weight of an epoxy functional copolymer having a Tg of from 25°–70° C. formed by polymerizing from 50–75 percent by weight of a glycidyl functional monomer and from 35–50 percent by weight of a monomer free of glycidyl functionality, and (b) from 10–40 percent by weight of a polycarboxylic acid crosslinking agent, wherein the ratio of epoxy:acid functionality is about 1:0.8 to 1.

8 Claims, No Drawings

5,663,240

POWDER COATING OF EPOXY-FUNCTIONAL ACRYLIC COPOLYMER AND POLYCARBOXYLIC ACID

This application is a continuation of application Ser. No. 08/375,323, filed Jan. 18, 1995, now abandoned, which is a division of application Ser. No. 08/143,722, filed Nov. 1, 1993, now U.S. Pat. No. 5,407,707, issued Apr. 18, 1995.

FIELD OF THE INVENTION

The present invention relates to powder coating compositions containing epoxy functional copolymers and polyacid curing agents.

BACKGROUND OF THE INVENTION

In recent years, powder coatings have become increasingly popular because these coatings are inherently low in volatile organic content (VOC), which significantly reduces air emissions during the application process. Epoxy condensation polymers, vinyl chloride polymers and acrylic resins have been used as the main film-forming polymers for these coatings. The advantage of the acrylic resin system over the epoxy condensation polymers and vinyl chloride polymers is that acrylic resins provide superior outdoor durability, are more resistant to heat and have better solvent and chemical resistance. The use of glycidyl functional acrylic resins provide such desired properties.

There is a need to apply powder coatings compositions in the automotive original equipment manufacturing (OEM) process. In today's competitive market, automobile manufacturers are placing stricter requirements on coatings properties and performance. Good exterior durability, acid etch and water spot resistance, and excellent gloss and appearance are typical examples. Currently, these properties can be achieved using epoxy-acid cured liquid coatings. However, liquid coatings have significantly higher VOC levels than powder coatings which essentially have zero VOC levels.

Although epoxy-acid systems are known for powder coatings, they are presently not widely used commercially for automotive OEM clear coatings because of inferior appearance, poor flow, and poor cured film properties. In addition, these coatings often have poor stability prior to the application process.

SUMMARY OF THE INVENTION

In the practice of the present invention, a powder coating composition comprising a solid, particulate mixture of the following ingredients is provided:

(a) 60 to 90 percent by weight based on weight of (a) and (b) of an epoxy functional copolymer having a Tg of 77° F. to 158° F. (25° C. to 70° C.) formed by polymerizing under free radical initiated polymerization conditions:
  (i) 50 to 75 percent by weight based on Weight of (i) and (ii) of a glycidyl functional ethylenically unsaturated monomer, and
  (ii) 25 to 50 percent by weight based on weight of (i) and (ii) of a copolymerizable ethylenically unsaturated monomer or mixture of monomers free of glycidyl functionality.
The epoxy functional copolymer contains from 3.0 to 5.9 moles of glycidyl groups per kilogram of epoxy functional copolymer and
(b) 10 to 40 percent by weight based on weight of (a) and (b) of a polycarboxylic acid crosslinking agent.
The ratio of epoxy functionality to acid functionality is about 1:0.8 to 1.

The powder coating compositions of the present invention, by using greater than 50% by weight of an epoxy functional copolymer with relatively high epoxy content (i.e., from 3.0 to 5.9 moles of glycidyl groups per kilogram of epoxy functional copolymer), have excellent physical and chemical properties. In addition, the coating compositions are stable and are formulated such that they have a relatively low melt viscosity which provides for good flow and excellent coating appearance.

DETAILED DESCRIPTION OF THE INVENTION

The epoxy functional copolymer is prepared by copolymerizing a glycidyl functional ethylenically unsaturated monomer, typically a glycidyl functional acrylic monomer, such as glycidyl acrylate or glycidyl methacrylate, with an ethylenically unsaturated monomer or mixture of monomers free of glycidyl functionality.

In the practice of the invention, the glycidyl functional monomer is typically copolymerized with a monomer with a Tg greater than 200° F. (93° C.). A high Tg monomer is important because it prevents caking and instability problems associated with powder coatings. Suitable monomers include methyl methacrylate; isobornyl methacrylate and styrene. Isobornyl methacrylate is preferred because it provides exterior durability, excellent appearance and flow, and good powder stability.

In addition to the glycidyl functional ethylenically unsaturated monomer and high Tg monomers, a different copolymerizable ethylenically unsaturated monomer or mixture of monomers can also be present. Examples of such monomers include esters of acrylic acid or methacrylic acid which can be represented by the structure:

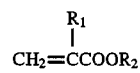

where $R_1$ is hydrogen or methyl and $R_2$ is hydrogen or alkyl having from 2 to 20 carbon atoms in the alkyl group. Examples of suitable acrylates or methacrylates include ethyl acrylate, propyl acrylate, n-butyl acrylate, isobutyl acrylate, t-butyl. acrylate, 2-ethylhexyl acrylate, lauryl acrylate, ethyl methacrylate, propyl methacrylate, n-butyl methacrylate, isobutyl methacrylate, t-butyl methacrylate, lauryl methacrylate, 2-ethylhexyl methacrylate, and so forth. Cyclic esters such as cyclohexyl acrylate and cyclohexyl methacrylate, as well as hydroxyalkyl esters such as 2-hydroxyethyl acrylate or methacrylate, 2-hydroxypropyl acrylate or methacrylate may also be used. In addition, vinyl aliphatic or vinyl aromatic compounds other than alpha-methyl styrene dimer which is considered a chain transfer agent, such as acrylonitrile, methacrylonitrile or styrene can be used.

The copolymer can be prepared by traditional free radical initiated polymerization techniques using suitable catalysts which include organic peroxides and azo type compounds and chain transfer agents such as alpha-methyl styrene dimer and tertiary dodecyl mercaptan.

The copolymer usually contains between (i) 50 to 75 percent by weight, based on weight of the copolymer, of the glycidyl functional ethylenically unsaturated monomer and usually between (ii) 25 to 50 percent of a copolymerizable ethylenically unsaturated monomer or mixture of monomers free of glycidyl functionality; the percentages by weight based on total weight of (i) and (ii). Preferably, the copolymer contains between (i) 50 to 65 percent by weight of the glycidyl functional monomer, between (ii) 25 and 40 percent by weight of one or more copolymerizable ethylenically unsaturated monomers having a Tg greater than 200° F. (93° C.) and between (iii) 5 to 15 percent by weight, based on weight, of one or more additional copolymerizable monomers different from (i) and (ii); the percentage by weight being based on (i), (ii), and (iii).

The Tg of the copolymer contributes to the stability of the powder coating composition. The higher the Tg of the copolymer, the better the stability of the coating. Tg is described in PRINCIPLES OF POLYMER CHEMISTRY (1953), Cornell University Press. The Tg can actually be measured or it can be calculated as described by Fox in *Bull. Amer. Physics Soc.*, 1, 3 page 123 (1956). Tg as used for the copolymer herein refers to actually measured values. Differential scanning calorimetry (DSC) can be used (rate of heating 18° F. (10° C.) per minute, Tg taken at the first inflection point).

The Tg of the high Tg monomers mentioned above refers to the calculated value of the homopolymer made from the monomer calculated as described above by Fox. For example, the Tg of methyl methacrylate monomer and styrene monomer is 221° F. (105° C.) and the Tg of isobornyl methacrylate monomer is 248° F. (120° C.) and is preferred because of the stability it provides to the powder coating composition.

The Tg of the copolymer is typically between 77° F. and 158° F. (25° C. and 70° C.), and more preferably between 95° F. and 131° F. (35° C. and 55° C.).

The epoxy functional copolymer has a number average molecular weight typically between 1000 and 5000. The term "molecular weight" refers to a number average molecular weight as determined by gel permeation chromatography using a polystyrene standard. Therefore, it is not an absolute number average molecular weight which is measured, but a number average molecular weight which is a measure relative to a set of polystyrene standards. The preferred number average molecular weight for the epoxy functional copolymer is between 1000 and 2500.

The epoxy functional copolymer usually contains from 3.5 to 5.9 moles of glycidyl functional ethylenically unsaturated monomer per kilogram of epoxy functional copolymer, more preferably between 3.0 and 5.1 moles of glycidyl functional monomer per kilogram of epoxy functional copolymer.

The powder coating composition is prepared by combining approximately 60 to 90 percent by weight of the epoxy functional copolymer with about 10 to 40 percent by weight, based on total weight of the powder coating composition, of a polycarboxylic acid crosslinking agent. Preferably the polycarboxylic acid is a crystalline material, more preferably a crystalline aliphatic material containing from 4 to 20 carbon atoms. Examples of suitable acids include adipic, succinic, sebacic, azelaic and dodecanedioic acid. In addition, carboxylic acid functional polyesters may be used to crosslink the powder coating composition. Low molecular weight polyesters and half-acid esters can be used which are based on the condensation of aliphatic polyols with aliphatic and/or aromatic polycarboxylic acids or anhydrides, or the reaction of aliphatic polyols and aliphatic and/or aromatic anhydrides, respectively. Examples of suitable aliphatic polyols include ethylene glycol, propylene glycol, butylene glycol, 1,6-hexanediol; trimethylol propane, di-trimethylol propane, neopentyl glycol, 1,4-cyclohexanedimethanol, pentaerythritol and the like. The polycarboxylic acids and anhydrides may include those mentioned above, as well as terephthalic acid, isophthalic acid, phthalic acid, phthalic anhydride, tetrahydrophthalic acid, tetrahydrophthalic anhydride, hexahydrophthalic acid, methyltetrahexahydrophthalic anhydride, alkylhexahydrophthalic anhydride, chlorendic anhydride and the like. Mixtures of the polycarboxylic acids, anhydrides and polyols may also be used.

Typically, the preferred range of epoxy functional copolymer to polycarboxylic acid crosslinking agent is between 70 to 85, more preferably 70 to 80 percent by weight epoxy functional copolymer and between 15 to 30, more preferably 20 to 30 percent by weight polycarboxylic acid crosslinking agent, based on total weight of the powder coating composition. The use of aliphatic crystalline dicarboxylic acids is preferred, and in particular, dodecanedioic acid is most preferred. The advantage of these crystalline crosslinkers, particularly at the higher levels, is that generally they are incompatible with the epoxy functional copolymer providing for a more stable powder coating composition. However, when the powder coating composition is melted the polyacid crosslinker is compatible and soluble in the acrylic copolymer acting somewhat as a diluent allowing for improved flow and appearance.

The powder coating composition may optionally contains additives for flow and wetting such as waxes, degassing additives such as benzoin, adjuvant resin to modify and optimize coating properties, ultraviolet (UV) light absorbers and curing catalyst. These optional additives, when present, are used in amounts up to 11.0% by weight based on weight of resin solids of the coating composition.

The powder coating is typically prepared by blending the epoxy functional copolymer and the polycarboxylic acid crosslinking agent for 15 minutes in a Henschel blade blender. The powder is then usually extruded through a Baker-Perkins twin screw extruder uncatalyzed at temperature between 230°–235° F. (110°–113° C.). Catalyst, such as, methyl dicocoamine, is usually added and the powder blended in the Henschel blender, hammer milled and re-extruded at a temperature between 190°–200° F. (87°–93° C.). The finished powder can be then classified to a particle size of usually between 20–30 microns in a cyclone grinder/sifter.

The ratio of epoxy functionality to acid functionality is typically between 1:0.8 to 1. Ratios of epoxy functionality to acid functionality lower than 1:1 tend to produce appearance problems in the final film.

Usually, the powder coating composition has a melt viscosity of less than 5,000 centipoise, preferably less than 2,500 centipoise and more preferably less than 2,000 centipoise.

The melt viscosity of the powder coating is measured using a Brookfield Model DV-II viscometer equipped with a #21 spindle. The test is performed by placing the epoxy functional copolymer or powder coating composition in a cell which is then loaded into a heated oven. When the copolymer or powder begins to melt, the #21 spindle is lowered into the cell and rotated. The melt viscosity in centipoise is plotted versus time in minutes. The lowest viscosity recorded, prior to gelling of the copolymer or powder coating, is taken as the melt viscosity. The measurement in centipoise (cps) is taken at the curing temperature of the powder coating, typically 275° F. (135° C.) at 1 revolution per minute (rpm).

Melt viscosity of the powder coating is a measure of flow response. The lower the measured number, i.e., the lower the resistance to flow, the smoother the final film. The powder coating compositions of the present invention are prepared with a high Tg epoxy functional copolymers which provide good stability. The epoxy functional copolymers have a relatively high melt viscosities and yet the melt viscosities of the powder coating compositions are low which results in excellent gloss and appearance of the cured coatings.

The powder coating composition is typically applied by spraying the substrate to be coated. The powder coating compositions of the present invention have particular utility as clear coat over colored or pigmented basecoats.

In a color-plus-clear application, a composite coating is applied to a substrate. The process comprises applying to the substrate a pigmented or colored film-forming composition to form a basecoat and applying to the basecoat a second film-forming composition to form a transparent or clear topcoat over the basecoat.

The film-forming composition of the basecoat can be any of the compositions useful in coatings applications, particularly automotive applications in which the color-plus-clear coating applications are finding their most use. A film-forming composition conventionally comprises a resinous binder and a pigment to act as a colorant. Particularly useful resinous binders are acrylic polymers, polyesters including alkyds, and polyurethanes.

The resinous binders for the basecoat can be organic solvent-based materials such as those described in U.S. Pat. No. 4,220,679, note column 2 line 24 continuing through column 4, line 40. Also, water-based coating compositions such as those described in U.S. Pat. No. 4,403,003, U.S. Pat. No. 4,147,679 and U.S. Pat. No. 5,071,904 can be used as the binder in the basecoat composition.

The basecoat composition also contains pigments including metallic pigmentation to give it color. Examples of suitable pigmentations can be found in U.S. Pat Nos. 4,220,679, 4,403,003, 4,147,679 and 5,071,904.

Optional ingredients in the basecoat composition are those which are well known in the art of formulating surface coatings and include surfactants, flow control agents, thixotropic agents, fillers, anti-gassing agents, organic co-solvents, catalysts, and other customary auxiliaries. Examples of these materials and suitable amounts are described in the aforementioned U.S. Pat. Nos. 4,220,679, 4,403,003, 4,147,769 and 5,071,904.

The basecoat compositions can be applied to the substrate by any of the conventional coating techniques such as brushing, spraying, dipping or flowing, but they are most often applied by spraying. The usual spray techniques and equipment for air spraying, airless spray and electrostatic spraying in either manual or automatic methods can be used.

During application of the basecoat to the substrate, a film of the basecoat is formed on the substrate typically in a thickness of about 0.1 to 5 and preferably 0.1 to 2 mils.

After forming a film of the basecoat on the substrate, the basecoat can be cured or alternately given a drying step in which solvent, that is, organic solvent and/or water, is driven out of the basecoat film by heating or an air drying period before application of the clear coat. Suitable drying conditions will depend on the particular basecoat composition, and on the ambient humidity with certain water-based compositions, but in general, a drying time of from about 1 to 15 minutes at a temperature of about 75° to 200° F. (21° to 93° C.) will be adequate.

The clear topcoat composition is applied to the basecoat by any of the conventional coating techniques mentioned above, although spray applications are preferred. As mentioned above, the clear topcoat can be applied to a cured or dried basecoat before the basecoat has been cured. In the latter instance, the two coatings are then heated to conjointly harden both layers. Typical curing conditions are at 265° to 300° F. (129° to 149° C.) for 20 to 30 minutes. The clear powder coating thickness is typically about 1 to 6 mils in dry film thickness.

EXAMPLES

The following non-limiting examples illustrate the preparation of glycidyl functional copolymers and powder coating compositions containing the glycidyl functional copolymer and polycarboxylic acid crosslinkers. The powder coatings were then tested for flow, cure response, chemical resistance, acid etch resistance, and appearance properties. All parts are by weight unless otherwise indicated. In examples A–D, the epoxy equivalent weights and moles of glycidyl groups are actual measured values unless otherwise indicated.

Polymer Example A

|  | PARTS BY WEIGHT (GRAMS) |
|---|---|
| CHARGE 1 | |
| Xylene | 2400.0 |
| CHARGE 2 | |
| Glycidyl Methacrylate | 3750.0 |
| Isobornyl Methacrylate | 2242.5 |
| Styrene | 750.0 |
| Methyl Methacrylate | 750.0 |
| Butyl Methacrylate | 7.5 |
| Methyl Styrene Dimer | 300.0 |
| CHARGE 3 | |
| LUPERSOL 555-M60 [a] | 437.5 |
| Xylene | 712.5 |
| CHARGE 4 | |
| Xylene | 300.0 |
| CHARGE 5 | |
| LUPERSOL 555-M-60 | 37.5 |
| Xylene | 37.5 |

[a] LUPERSOL 555-M60, t-amyl peroxyacetate (60% in odorless mineral spirits), available from Elf-Atochem North America, Inc.

In a 12 liter round bottom flask equipped with an air driven agitator, reflux condenser, thermometer, nitrogen inlet port, and 2 addition ports, charge 1 was heated to 275° F. (135° C.) under a blanket of nitrogen. At 275° F. (135° C.), Charge 2 and Charge 3 were started simultaneously. Charge 2 was introduced over a period of 2 hours and Charge 3 was introduced over 3.5 hours. Upon completion of Charges 2 and 3, the feed lines were rinsed with Charge 4 and then Charge 5 was added. The batch was then held for 2 hours at 275° F. (135° C.). Upon completion of polymerization, the batch was devolatilized by vacuum distillation over a 4 hour period. During the devolatilization process the temperature of the batch increased to 356° F. (180° C.). The finished polymer had a total solids content of 99.3%, an epoxy equivalent weight of 311.7 and contained 3.2 moles of glycidyl groups per kilogram of epoxy functional copolymer (theoretical 3.4 moles of glycidyl groups per kilogram of epoxy functional copolymer), and a number average molecular weight of 1207.

Comparative Polymer Example B

|  | PARTS BY WEIGHT (GRAMS) |
|---|---|
| CHARGE 1 | |
| Xylene | 536.0 |
| CHARGE 2 | |
| Glycidyl Methacrylate | 896.5 |

| -continued | |
|---|---|
| | PARTS BY WEIGHT (GRAMS) |
| Styrene | 224.2 |
| Methyl Methacrylate | 896.3 |
| Butyl Acrylate | 224.2 |
| CHARGE 3 | |
| VAZO-67 [b] | 112.0 |
| Xylene | 384.7 |
| CHARGE 4 | |
| Xylene | 20.6 |
| VAZO-67 | 9.0 |
| CHARGE 5 | |
| VAZO-67 | 9.0 |
| Xylene | 20.6 |

[b] VAZO-67, 2,2-diethylazobisisobutyronitrile, available from E. I. DuPont de Nemours and Company.

In a 5 liter round bottom flask equipped with an air driven agitator, reflux condenser thermometer, nitrogen inlet port, and 2 addition ports, Charge 1 was heated to 275° F. (135° C.) under a blanket of nitrogen. At 275° F. (135° C.), Charge 2 and Charge 3 were started simultaneously over a period of 3 hours. When Charge and 3 were complete, Charge 4 was added and the batch was held for 1 hour at 275° F. (135° C.). Then Charge 5 was added and the batch was held an additional 1.5 hours at 275° F. (135 ° C.). Upon completion of polymerization, the batch was devolatilized by vacuum distillation over a 4 hour period. During the devolatilization process the temperature of the batch increased to 338° F. (170° C.). The finished polymer had a total solids content of 97.9%, an epoxy equivalent weight of 369.0 and contained 2.7 moles of glycidyl groups per kilogram of epoxy functional copolymer (theoretical 2.8 moles of glycidyl groups per kilogram of copolymer), and a number average molecular weight of 2721.

b VAZO-67, 2,2-diethylazobisisobutyronitrile, available from E. I. Dupont de Nemours and Company.

Polymer Example C

| | PARTS BY WEIGHT (GRAMS) |
|---|---|
| CHARGE 1 | |
| Xylene | 800.0 |
| CHARGE 2 | |
| Glycidyl Methacrylate | 1000.0 |
| Styrene | 200.0 |
| Methyl Methacrylate | 600.0 |
| Butyl Acrylate | 200.0 |
| Tertiary-dodecyl Mercaptan | 20.0 |
| CHARGE 3 | |
| LUPERSOL 555-M60 | 116.7 |
| Xylene | 265.3 |
| CHARGE 4 | |
| Xylene | 100.0 |

In a 5 liter round bottom flask equipped with an air driven agitator, reflux condenser, thermometer, nitrogen inlet port, and 2 addition polls, Charge 1 was heated to 275° F. (135° C.) under a blanket of nitrogen. At 275° F. (135° C.), Charge 2 and Charge 3 were started simultaneously. Charge 2 was introduced over a period of 3 hours and Charge 3 was introduced over 3.5 hours. Upon completion of Charges 2 and 3, the feed lines were rinsed with Charge 4. The batch was then held for 1 hour at 275° F. (135° C.). Upon completion of polymerization, the batch was devolatilized by vacuum distillation over a 3.5 hour period. During the devolatilization process, the temperature of the batch increased to 320° F. (160° C.). The finished polymer had a total solids content of 99.7%, an epoxy equivalent weight of 284.0 and contained 3.5 moles of glycidyl groups per kilogram of epoxy functional copolymer (theoretical 3.5 moles of glycidyl groups per kilogram of epoxy functional copolymer), and a number average molecular weight of 2769.

Polymer Example D

| | PARTS BY WEIGHT (GRAMS) |
|---|---|
| CHARGE 1 | |
| Xylene | 2400.0 |
| CHARGE 2 | |
| Glycidyl Methacrylate | 4500.0 |
| Styrene | 1200.0 |
| Isobornyl Methacrylate | 1800.0 |
| CHARGE 3 | |
| LUPERSOL 555-M60 | 500.0 |
| Xylene | 650.0 |
| CHARGE 4 | |
| Xylene | 300.0 |
| CHARGE 5 | |
| LUPERSOL 555-M60 | 62.5 |
| Xylene | 57.5 |

In a 12 liter round bottom flask equipped with an air driven agitator, reflux condenser, thermometer, nitrogen inlet port., and 2 addition ports, Charge 1 was heated to 275° F. (135° C.) under a blanket of nitrogen. At 275° F. (135° C.), Charge 2 and Charge 3 were started simultaneously. Charge 2 was introduced over a period of 3 hours and Charge 3 was introduced over 4 hours. Upon completion of Charges 2 and 3, the feed lines were rinsed with Charge 4 and then Charge 5 was added. The batch was then held for 1 hour at 275° F. (135° C.). Upon completion of polymerization the batch was devolatilized by vacuum distillation over a 6 hour and 45 minute period. During the devolatilization process the temperature of the batch increased to 338° F. (170° C.). The finished polymer had a total solids content of 99.3%, an epoxy equivalent weight of 260.1 and contained 3.9 moles of glycidyl groups per kilogram of epoxy functional copolymer (theoretical 4.2 moles of glycidyl groups per kilogram of copolymer), and a number average molecular weight of 1347.

Powder Coating Example 1

| COMPONENT | PARTS BY WEIGHT (GRAMS) |
|---|---|
| Polymer of Example A | 933.0 |
| Dodecanedioic Acid | 276.0 |
| Hydrogenated Bisphenol A | 36.0 |
| RESIFLOW L [c] | 12.6 |
| Benzoin | 2.4 |
| Wax C [d] | 7.3 |
| TINUVIN 144 [e] | 12.1 |
| TINUVIN 900 [e] | 24.2 |
| Methyl Dicocoamine | 10.0 |

[c] RESIFLOW L, an acrylic flow control additive, available from Estron Chemical, Inc.

| COMPONENT | PARTS BY WEIGHT (GRAMS) |
|---|---|
| [d] Wax C, bisstearamide of ethylene diamine, an air release agent available from Hoechst Celanese. | |
| [e] TINUVIN 144 (2-tert-butyl-2-(4-hydroxy-3,5-di-tert-butylbenzyl)[bis(methyl-2,2,6,6,-tetramethyl-4-piperidinyl)]dipropionate) and TINUVIN 900 (2-(3',5'-bis(1-methyl-1-phenylethyl)-2'-hydroxyphenyl) benzotriazole) are ultraviolet light stabilizers available from Ciba-Geigy, Corp. | |

All components were weighed and blended for 15 minutes in a Henschel Blade Blender. The mixture is extruded through a Baker-Perkins twin screw extruder uncatalyzed at a temperature of 230°–235° F. (110°–113° C.). The dimethyl cocoamine catalyst is then added and the mixture blended in the Henschel Blender, hammer milled, and then extruded again at 190°–200° F. (87°–93° C.). The product is then classified to a particle size of 20–30 microns in a cyclone grinder/sorter.

Comparative Powder Coating Example 2

| COMPONENT | PARTS BY WEIGHT (GRAMS) |
|---|---|
| Polymer of Example B | 656.0 |
| Dodecanedioic Acid | 161.0 |
| GCA-1 [f] | 12.2 |
| Benzoin | 1.6 |
| Wax C | 4.9 |
| TINUVIN 144 | 8.2 |
| TINUVIN 900 | 16.3 |
| Methyl Dicocoamine | 8.2 |

[f] GCA-1, an anti-yellowing agent from Sanko Chemical Corp.

All components were weighed, blended, extruded and particulated in the same manner as powder coating Example 1.

| COMPONENT | PARTS BY WEIGHT (GRAMS) |
|---|---|
| Polymer of Example C | 660.0 |
| Dodecanedioic Acid | 202.0 |
| RESIFLOW L | 6.9 |
| GCA-1 | 8.6 |
| Benzoin | 6.9 |
| Wax C | 4.9 |
| TINUVIN 144 | 8.6 |
| TINUVIN 900 | 17.2 |
| Methyl Dicocoamine | 9.1 |

All components were weighed, blended, extruded and particulated in the same manner as powder coating Example 1.

Powder Coating Example 4

| COMPONENT | PARTS BY WEIGHT (GRAMS) |
|---|---|
| Polymer of Example D | 690.0 |
| Dodecanedioic Acid | 230.0 |
| RESIFLOW L | 6.7 |
| Benzoin | 1.6 |
| Wax C | 4.9 |
| TINUVIN 144 | 8.1 |
| TINUVIN 900 | 16.2 |
| GCA-1 | 24.4 |
| Methyl Dicocoamine | 2.8 |

All components were weighed, blended, extruded and particulated in the same manner as the powder coating in Example 1.

Powder Coating Example 5.

| COMPONENT | PARTS BY WEIGHT (GRAMS) |
|---|---|
| Polymer of Example A | 669.0 |
| Sebacic Acid | 178.0 |
| RESIFLOW L | 6.8 |
| Benzoin | 6.8 |
| GCA-1 | 8.5 |
| TINUVIN 144 | 8.5 |
| TINUVIN 900 | 16.9 |
| Methyl Dicocoamine | 8.9 |

All components were weighed, blended, extruded and particulated in the same manner as the powder coating in Example 1.

Powder Coating Test Results

The powder compositions of coating examples 1–5 were electrostatically spray applied as clear coats over BWB8555 black aqueous basecoat available from PPG Industries, Inc. to form composite clear over color composite coatings. The coating examples were baked at 275° F. (135° C.) for 30 minutes. The Tg of the epoxy functional copolymer and the physical properties of the clear coating composition and of the clear coat are reported in the table below.

| Coating Example | Tg of Acrylic[1] | Melt Viscosity of Acrylic[2] | Melt Viscosity of Coating[3] | Gel Time at 275° F. (135° C.)[4] | Physical Stability at 90° F. (32° C.) for 24 hours[5] | 20° Gloss[6] | DOI[7] | Acid Spot with pH 3 $H_2SO_4$ at 140° F. (60 °C.) at 10/20/30 minutes[8] |
|---|---|---|---|---|---|---|---|---|
| Powder Coating Example 1 | 38.6° C. | 11,800 cps | 1100 cps | 4 m 48 s | Slightly Clumped | 86.8 | 89 | 5/5/5 |
| Powder Coating Example 2 | 49.5° C. | 23,000 cps | 3000 cps | 5 m 10 s | Fused | 84.4 | 87 | 2/2/2 |
| Powder Coating Example 3 | 56.0° C. | 35,000 cps | 2100 cps | 3 m 48 s | Clumped | 87.2 | 73 | 4/4/4 |
| Powder Coating Example 4 | 41.4° C. | 5,600 cps | 1600 cps | 2 m 45 s | Slightly Caked | 85.5 | 83 | 4/4/4 |

| Coating Example | Tg of Acrylic[1] | Melt Viscosity of Acrylic[2] | Melt Viscosity of Coating[3] | Gel Time at 275° F. (135° C.)[4] | Physical Stability at 90° F. (32° C.) for 24 hours[5] | 20° Gloss[6] | DOI[7] | Acid Spot with pH 3 $H_2SO_4$ at 140° F. (60 °C.) at 10/20/30 minutes[8] |
|---|---|---|---|---|---|---|---|---|
| Powder Coating Example 5 | 38.6° C. | 11,800 cps | 1100 cps | 4 m 21 s | Slightly Caked | 87.1 | 90 | 5/5/5 |

[1]The Tg of the acrylic copolymer was measured by differential scanning calorimetry (DSC) at a heating rate of 10° C. per minute. The Tg was measured at the first inflection point.
[2]The melt viscosity of the epoxy functional copolymer was measured using a hot cell Brookfield Model DV-II viscometer equipped with a #21 spindle. The copolymer was first put into a cell and then placed into an oven heated at 302° F. (150° C.). Once the copolymer began to melt, the #21 spindle was lowered into the hot cell and rotated at 1 revolution per minute (rpm). The melt viscosity of the copolymer was measured in centipoise (cps) versus time in minutes. The lowest melt viscosity is reported as the melt viscosity of the copolymer.
[3]The melt viscosity of the powder coating composition was measured using a hot cell Brookfield Model DV-II viscometer equipped with a #21 spindle. The measurement in centipoise (cps) was taken at 275° F. (135° C.) at 1 revolution per minute (rpm). The melt viscosity of the powder coating composition was measured in cps versus time in minutes. The lowest melt viscosity before the composition gelled is reported as the melt viscosity of the powder coating composition.
[4]Gel time of the powder coating composition was measured at 275° F. (135° C.) on a hot plate manufactured by Cureplate Thermoelectric Co. according to ASTM Method D3451-14. Gel time is reported in minutes (m) and seconds (s).
[5]Physical stability of the powder coating was determined by observing the physical state of the powder after 24 hour exposure at 90° F. (32° C.) in a glass jar. After exposure, the jar containing the powder was inverted and the physical state of the powder observed and reported. Slightly caked is better than caked and slightly clumped is better than clumped, with caking being better than clumping. The term "fused" indicated a solid, non-separable block of coating.
[6]20° Gloss of the clear coat was measured with a Hunter Laboratories Model D-52 20° Glossmeter by ASTM Method D-523. The higher the value, the higher the gloss.
[7]DOI (distinctness of image) of the clear coat was measured on a Dori-gon II Meter manufactured by Hunter Laboratories. The higher the value, the higher the DOI which is the ability of a coating to reflect an image in a sharp, clear fashion.
[8]An acid spot resistance test of the clear coat was performed by first preparing a concentrated sulfuric acid solution of pH 3. Three drops of the acid solution were placed on the baked panel of each coating and placed in an oven heated to about 140° F. (60° C.) for 10 minute intervals up to 30 minutes. After each ten minute interval, and additional 3 drops of the acid solution were put on the previously spotted panel area and the panel was reheated for 10 minutes. Panels were washed and rated (1 = worst and 5 = best) at 10, 20 and 30 minutes.

We claim:

1. A powder coating film-forming composition comprising a solid, particulate mixture of:
   (a) 60 to 90 percent by weight based on weight of (a) and (b) of an epoxy functional acrylic copolymer consisting essentially of epoxy functional acrylic copolymer having a Tg of 95° F. to 181° F. (35° C. to 55° C.) and a number average molecular weight of 1000 to 2500 formed by polymerizing under free radical initiated polymerization conditions:
      (i) 50 to 65 percent by weight based on weight of (i), (ii), and (iii) of a glycidyl acrylate or methacrylate,
      (ii) 25 to 40 percent by weight based on weight of (i), (ii), and (iii) of isobornyl methacrylate; and
      (iii) 5 to 15 percent by weight of copolymerizable ethylenically unsaturated monomers different from (i) or (ii);
   said epoxy functional copolymer containing from 3.0 to 5.9 moles of glycidyl groups per kilogram of epoxy functional copolymer, whereby the Tg of this copolymer contributes to the stability of the powder coating composition;
   (b) 10 to 40 percent by weight based on weight of (a) and (b) of a polycarboxylic acid crosslinking agent;
   where the ratio of epoxy functionality to acid functionality is about 1:08 to 1, and where the powder coating composition has a melt viscosity less than 2000 centipoises.

2. The powder coating composition of claim 1 wherein (iii) contains alpha-methyl styrene dimer.

3. The powder coating composition of claim 1 wherein (iii) is selected from the group consisting of alkyl acrylates, and alkyl methacrylates from 2 to 20 carbon atoms in the alkyl group.

4. The powder coating composition of claim 1 wherein the polycarboxylic acid is a crystalline material containing from 4 to 20 carbon atoms.

5. The powder coating composition of claim 4 wherein the polycarboxylic acid is dodecanedioic acid.

6. The powder coating composition of claim 1 where (a) is present in an amount of 70 to 85 percent by weight and (b) is present in an amount of 15 to 30 percent by weight.

7. The powder coating composition of claim 1 wherein said epoxy functional copolymer contains from 3.0 to 5.1 moles of glycidyl functional ethylenically unsaturated monomer per kilogram of epoxy functional copolymer.

8. The powder coating composition of claim 1 which has a melt viscosity less than 5000 centipoises.

* * * * *